Sept. 11, 1951 W. E. NICHOLOY 2,567,494
CONVEYER BELT ALIGNING MECHANISM
Filed April 24, 1947 2 Sheets-Sheet 1

INVENTOR.
Winford E. Nicholoy
BY
Warren H. F. Schmieding
Attorney

Sept. 11, 1951  W. E. NICHOLOY  2,567,494
CONVEYER BELT ALIGNING MECHANISM
Filed April 24, 1947  2 Sheets-Sheet 2

INVENTOR.
Winford E. Nicholoy
BY
ATTORNEY

Patented Sept. 11, 1951

2,567,494

UNITED STATES PATENT OFFICE 2,567,494

CONVEYER BELT ALIGNING MECHANISM

Winford E. Nicholoy, Columbus, Ohio, assignor to The Scott Viner Company, Columbus, Ohio, a corporation of Ohio Application April 24, 1947, Serial No. 743,495

2 Claims. (Cl. 198—202)

This invention relates to harvesting machines, and more particularly to a type adapted to hull and separate peas, beans and the like from the vines and pods, and in which there is a conveyor apron guide to keep the conveyor apron moving in a substantially straight path and out of rubbing and wearing contacts.

One of the objects of this invention is to provide in a harvesting machine a self adjusting and aligning guide means for use on the end rolls to move the conveyor apron out of the path of travel wherein its side edges are in rubbing contact, which can be installed readily and operated efficiently, and maintained with a minimum of service and expense.

It is also one of the objects to provide in a machine for hulling and separating peas, beans, and the like from vines and pods a guide means which aligns the commodity apron and keeps it running in a substantially straight path. This feature is provided so that the apron will not run too far to one side or the other and ride upon the rub or flap boards, which extend above the apron at each edge thereof and serve to direct commodities falling near the apron edges onto the apron. Such riding of the apron on the flap boards allows a portion of the commodities to fall through the open or exposed area on the opposite side from which the apron is moving out of alignment. Commodities falling through in this manner are caught on the lower side of the apron and carried into the end rollers where they are mashed and soon require a time consuming cleaning operation. One of the advantages obtained from guiding the commodity apron in a substantially straight path is thus being able to avoid mashing parts of the commodity in the manner stated and having to stop the machine and clean the rollers.

Another object is to provide for a machine of the type described an apron guide adapted to receive the ends of the wooden slats projecting from the conveyor apron, whenever the apron moves substantially out of its normal path of travel, and impart sufficient thrust thereto to cause the apron to travel back into its normal path of travel in which it is out of rubbing contact with the top guide or sides of the machine.

An additional object is to provide apron guides mounted directly upon the end rollers of a machine of the character described adapted to receive the side edges of the slow moving flexible fabric apron as it tends to move out of its normal path of travel and return the apron to such path of travel that there will be no rubbing contact with the top guide or side edges of the machine.

A still further object is to provide a self adjusting apron guide which can be mounted directly upon the ends of the apron roller of a vining machine and rotated therewith, and which eliminates the need for using rub boards as guide means along the side of the apron.

It is also an object to provide means for increasing the amount of service normally obtained from a conveyor apron by decreasing the amount of rubbing contact and tearing to which the edges thereof are normally subjected, which are simple to install and easy to remove, and which minimize the wear encountered on the ends of the apron slats by providing a pushing action on the slats as they go over both the top and bottom apron roller, thereby preventing the apron from running too far to either side and making adjustment thereof a relatively easy, simple job saving considerable time and reducing the cost of up-keep by increasing the service obtained from the apron.

Other objects and advantages of this invention will be apparent from the following descriptions, the appended claims, and the accompanying drawings wherein preferred forms of embodiments of the invention are shown.

Figure 2:
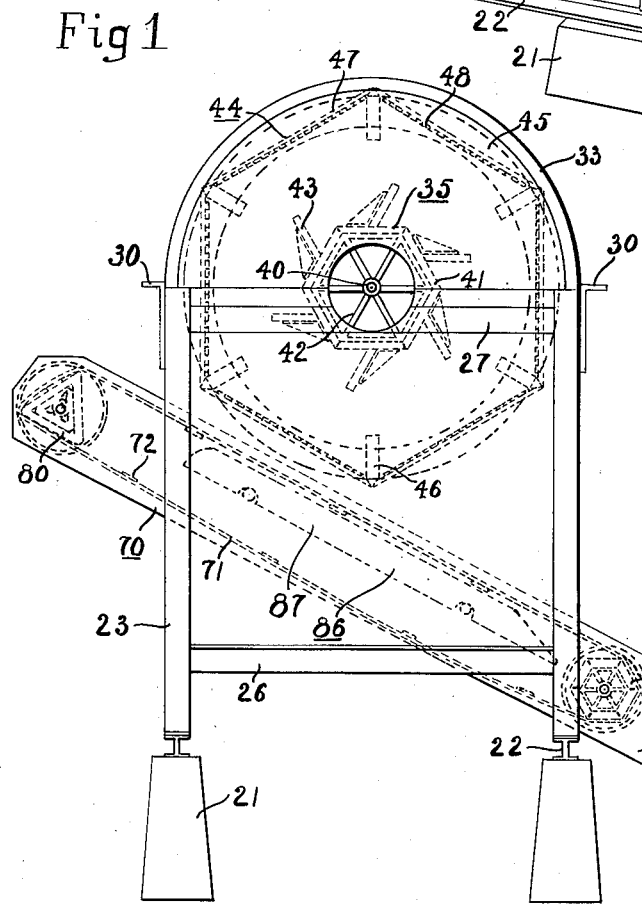
Fig. 2 is a partial side elevational view of the machine shown in Fig. 1, as seen from the right end thereof, the feeder for feeding the vines into the machine being removed for clearer illustration of the conveyor apron.

Referring to the drawings, the harvesting machine 19 has a frame 20 supported on the foundation blocks 21 comprising the horizontally positioned sills 22 which are secured, as by welding or by means of bolts if preferred, to the vertical bent member 23. At each end the frame is additionally braced by end girts 26 and 27, as well as by side girts 30 on each side. A top housing 33 is mounted thereon within which a rotatably mounted cylinder 35, Fig. 2, is positioned. This cylinder 35 is supported near the top of the frame 26, being suitably journalled in bearings 40 provided at each end thereof. Cylinder 35, which is in the form of a hexagon, is assembled with the boards 41 mounted on a supporting frame or wheel 42. Projecting from the outer surfaces of the cylinder are steel beaters 43 which are mounted at a slight angle as shown in Fig. 2 for a clockwise movement of the cylinder, and which facilitate the threshing action, as well as providing for carrying the empty pods, hulls and vines through the reel assembly 44 to the point of discharge.

Figure 1:
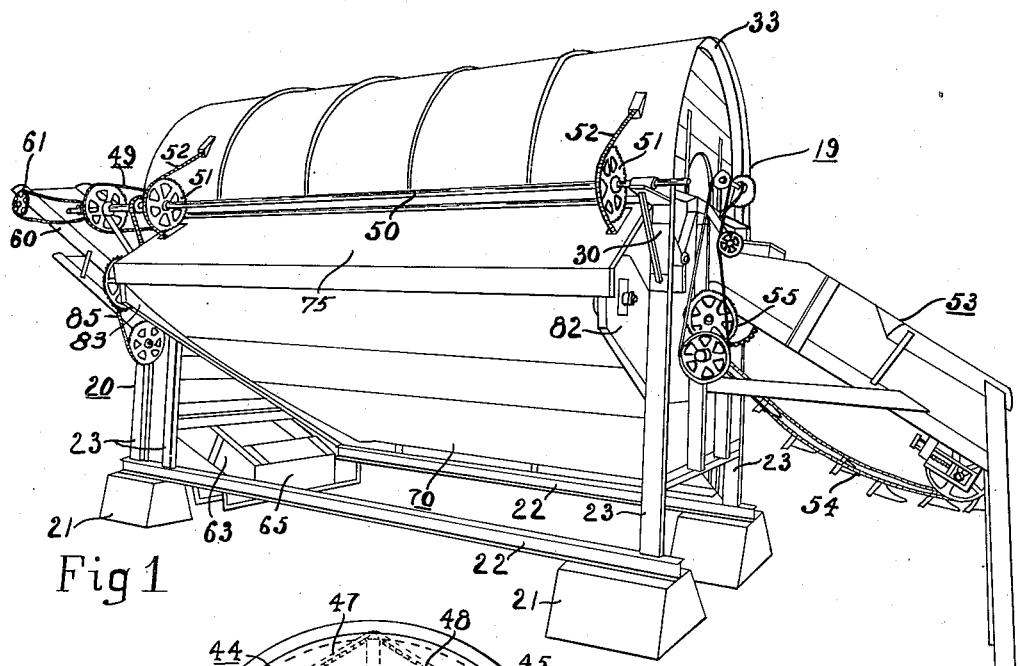
Fig. 1 is a perspective view of a harvesting machine embodying one form of this invention.

The reel assembly 44 is also rotatably mounted and in general comprises a pair of cylindrical end members 45, Fig. 2, in which a plurality of longitudinally extending ribs 46 are positioned. Mounted between the ribs 46 are the wooden frames 47 which are covered with rubber sheets 48 having about five-eighths (⅝) inch perforations formed therein. Suitable power driven drive means 49, Fig. 1, are provided for rotating the cylinder 35, power being transmitted to the reel, however, from a counter shaft 50 and through the sprocket wheels 51 and chains 52.

A feeder 53 mounted at one end of the machine 19 is provided with a chain loading mechanism 54 suitably driven by means of the gear and sprocket drive 55. This feeder is loaded at its lower end with peas, for example, in vines or pods as they are brought from the field and carries them up to a discharge point within the reel 44 where they are threshed to effect a separation from the pods, hulls and vines. After this separation has taken place, the pods or hulls and vines are carried through the reel 44 and are discharged at the opposite end upon the lower end of the inclined straw carrier 60. This carrier, the principal object of which is to carry away the vines discharged from the reel 44, also has a sprocket and chain drive 61 for supplying motive power. There is also a further separation of any peas or beans which remained in their pods or hulls after passing through the reel 44. In this operation, the vines, empty hulls and chaff are discharged from the upper end of the carrier 60. Any remaining peas or beans fall through the perforated or slotted bottom onto the under carrier 63 and are subsequently collected in the box 65.

Referring to Fig. 2, the peas, for example, that are separated as the pods or hulls pass through the reel 44, and portions of the vines and hulls which are broken small enough to pass through the perforations in the sheets 48, fall through and are deposited upon the upper surface of an upwardly inclined conveyor apron assembly 70 which has an apron 71 mounted for endless rotation. This apron is substantially flat and constructed preferably of material such as commercial grade number 2 cotton duck, and has a width of approximately 12 feet 3 inches and a circumference of about 20 feet 10 inches. To operate the most effectively and efficiently, the apron 71 is mounted to move upwardly, that is, from right to left as viewed in Fig. 2, and at a relatively slow speed of approximately 69 feet per minute.

Figure 4:
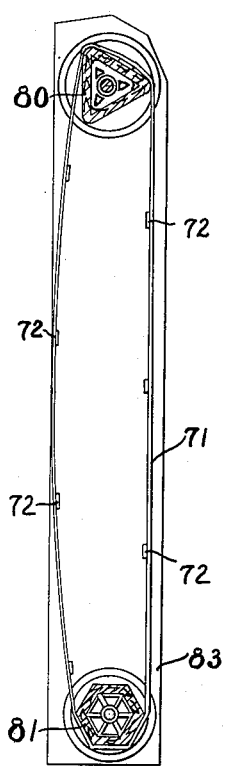
Fig. 4 is a side sectional view taken substantially on the line 4—4 of Fig. 3.
Figure 3:
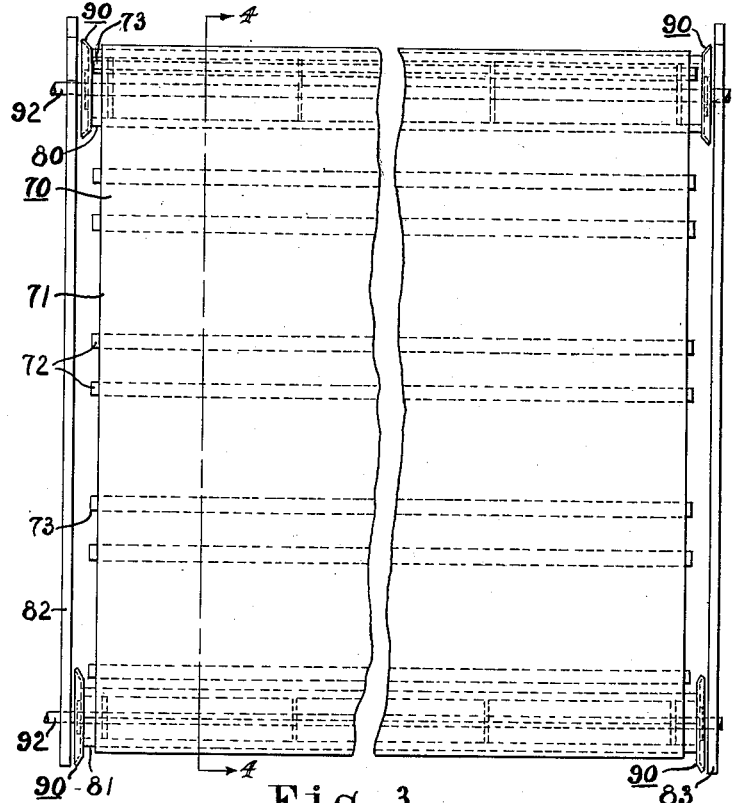
Fig. 3 is a plan view of the conveyor apron assembly.
Figure 5:
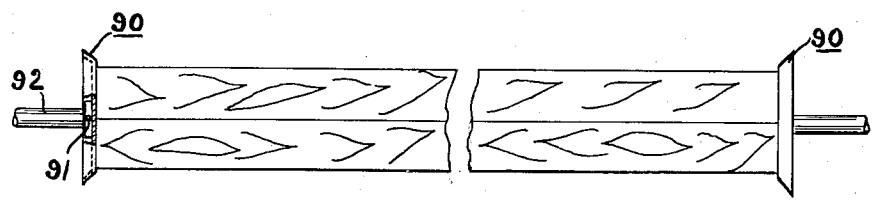
Fig. 5 is a broken, elevational view of one of the rollers over which the conveyor apron passes.
Figure 6:
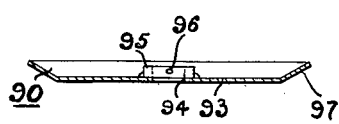
Fig. 6 is a sectional view on an enlarged scale of one of the apron guides.

Spaced at regular intervals of about 30 inches apart along the circumference, wooden slats 72, Figs. 3 and 4, are fastened as by tacking to the inside surface of apron 71. These slats 72 extend entirely across the width of the apron and are each approximately 1⅝ inches wide by 7/16 inch thick and 12 feet 5 inches long. The ends of the slats thus extend, from each side of the apron by a substantial amount, about 1 inch as shown at 73 in Fig. 3. These slats serve to hold the apron flat in passing over the end rollers 80 and 81 and through the machine.

In operation a flopping action or motion is imparted to the apron 71. This action shakes the peas loose from the chaff, i. e. pieces of pods, hulls, leaves, or pieces of vines which came through the perforated sheets 48. The peas or beans roll down the inclined apron and are collected in a box 74 while the chaff is carried upward on the apron and discharged over the top of roller 80 into a suitable receptacle, not shown, or upon the ground. A protecting hood 75 is also provided at the upper end of the apron to prevent wind from blowing the hulls and vine shreds and to direct their discharge downwardly.

The apron 71 is mounted for endless rotation over the end rollers 80 and 81, which are positioned between the side boards 82 and 83. The roller 80 is positioned substantially above the horizontal plane through roller 81, Fig. 2, so that the apron travels upwardly in an inclined plane of about 27 degrees. A sprocket and chain drive 85 is provided for driving the top roller 80, which is rotatably mounted in bearings at each end thereof. The lower roller 81 is also journalled for rotation and is driven frictionally by the apron. In constructing the rollers 80 and 81 it is preferred that they both be of non-circular cross sectional shape, so that the rotation thereof imparts a flopping action or motion to the apron 71. Thus as illustrated in Figs. 2 and 4, the top roller 80 is of triangular shape while the lower or bottom roller 81 is hexagonal in form. In some models of this machine the bottom roller is square, the construction and operation of the apron 71 being the same in all models however. With this uncrowned type of roller construction, together with the slats 72 of the apron, the apron in passing around the rollers and over the successive flat faces or surfaces on the rollers, has the above referred to flopping action or motion imparted thereto which causes the separation of the commodity from the mass of chaff deposited upon the apron 71. To provide a skeleton bottom or support for the apron, and to facilitate keeping the apron in a flat plane, a scow 86 is mounted to extend beneath the upper side of the apron 71. This scow comprises a plurality of wooden members 87 spaced a substantial distance apart on rods provided for that purpose. As seen in Fig. 2, the slats 72 ride upwardly on the members 87 as the apron is rotated.

The apron because of its flexibility, direction of travel, and rate of movement tends at times to run out of its normal path of travel. As a result the ends 73 of the slats come into rubbing contact with the side boards 82 and 83 of the machine, or the top guides thereof, and after sufficient wearing down in this manner the edges of the apron 71 are subject to wear and tear necessitating replacement. In replacing the apron, adjustment and aligning of the new apron so that it will run true is a somewhat difficult and time consuming operation, and if not properly accomplished results in undue wear and low service life for the apron.

To provide for aligning the apron and to prevent it from running too far to either side of its normal path of travel, a metal guide 90 is mounted in a position adjacent to each end of each of the rollers, being fastened with a set screw 91 to the shaft 92 passing through the rollers 80 and 81. The guide 90 rotates with the roller to which it is attached and at the same speed as the apron travels. The guide is constructed with a flat disc like member 93 and is provided with a central bore 94 through which the roller shaft 92 is received. A collar 95 is welded in alignment with the bore 94 and is bored and threaded as at 96 to receive the set screw 91, by means of which it is secured to the shaft 92. In constructing the guide 90, for example, one to be used with the triangular roller 80, the diameter of the disc member 93 is 14 inches while the flanged edge portion 97 is 1⅜ inches in length, the depth of the guide being ¾ inch. It is preferred that steel ⅛ inch thick be used for the guide. It will be understood that the diameter of disc member 93 will be somewhat smaller for the guide to be used on the bottom roller 81 since it is of smaller diameter than the top roller 80. However, in other respects the guides are similar.

In operation it has been found that with the apron guides 90 constructed as described any tendency for the apron to run out of its proper path of travel, that is, out of alignment to an extent in which the ends 73 of the slats 72 are in rubbing contact with the sides of the machine is corrected. The ends 73 of the slats in passing over the rollers 80 and 81 do not engage with the portion 93 of the guide when the apron 71 is running true and in its normal path of travel. A clearance of about ½ to 1 inch being maintained under such conditions between the ends 73 of the slats and portion 93 of the guide as shown at the top of Fig. 3. When the apron starts to run out of its proper course the ends 73 of the slats engage the beveled surface of the flanged edge portion 97 of the guides. This surface is so shaped and formed as to impart a gentle, yet sufficiently firm pushing action on the end 73 of each apron slat 72 as it goes over the roller to correct any deviation from the true running path, and thus continuously adjusts and corrects the travel of the apron to prevent it from running too far toward either side. With this construction and arrangement of apron guides, there is no tendency to over align or compensate for deviation from the normal running path. The apron guides are self-adjusting in this respect and continuously apply a corrective movement to the apron tending to keep the apron running properly and without side rubbing contacts. It is to be noted also that with this construction, the guide 90 corrects the deviation of the apron by a pushing action applied to the ends of the slats 72 which is accomplished without wearing or rubbing the ends 73. This is due to the fact that the guide 90 rotates i. e. travels with the end of the slat as it moves around the roller and at the same speed.

From the above description it will be apparent that there has been provided a self-adjusting apron guide for use on the long, uncrowned apron rollers of a harvesting machine of the character described. With these guides, it will be apparent also that a wide, flexible conveyor apron operating at relatively slow speed, and running loose so as to permit the flopping action necessary to separate peas or beans and the like from the chaff, can be continuously adjusted and guided so as to prevent it from running too far either to one side or the other. These guides thus prevent the edge of the apron from wearing and tearing caused by rubbing contact with the sides of the machine, and increase the normal service which can be obtained from the conveyor apron. The apron guides are easily installed or removed and make the adjusting of the apron a relatively easy and simple job which saves the operator considerable time and reduces the up-keep cost of the machine through increased service life obtained from the apron.

While the form of embodiment of the present invention as herein disclosed constitutes a preferred form, it is to be understood that other forms can be adopted which come within the scope of the appended claims.

I claim:

1. In a harvesting machine for hulling and separating peas, beans and the like from the pods, vines and chaff, the combination of a substantially flat inclined endless fabric conveyor apron, a pair of non-circular end rollers over which said apron is adapted to travel, means for rotating one of said end rollers to provide for moving said apron at a predetermined rate in an inclined plane, transverse wooden slats spaced apart on the inner side of said apron and having the ends thereof projecting from the side edges thereof a substantial distance, and a self-adjusting apron guide removably attached to each end of said rollers comprising a plate having a bevelled edge adapted to engage the ends of said slats when said apron moves substantially out of its normal path of travel, said bevelled edge traveling around the roller in engagement with the end of a slat and at the same speed of rotation as the roller and imparting a pushing action to the end of each slat in contact therewith to provide for changing the direction of the path of travel to align said apron in a path of travel in which there is no rubbing contact with said bevelled edge.

2. In a harvesting machine for hulling and separating peas, beans and the like from the pods, vines and chaff, the combination of a substantially flat, inclined, endless conveyor apron of fabric having wooden slats mounted transversely thereon, the ends of said slats projecting from each side of said apron, non-circular rollers at each end of said apron for imparting a flopping action thereto, means for rotating one of said end rollers to provide for moving said apron at a predetermined rate in an inclined plane, and an apron guide comprising a flanged plate having a bevelled edge attached to the ends of each roller and rotatable therewith and mounted to receive the ends of said slats when said apron moves substantially out of its normal path of travel, said bevelled edge after engaging the end of a slat traveling therewith around the roller and imparting a firm pushing action thereto in the direction opposite to which the apron is tending to run to provide for changing the direction of the path of travel to align said apron in a path of travel in which there is no rubbing contact with said apron guides.

WINFORD E. NICHOLOY.

REFERENCES CITED

The following references are of record in the file of this patent:

UNITED STATES PATENTS

| Number | Name | Date |
| --- | --- | --- |
| 675,703 | Allen | June 4, 1901 |
| 994,910 | Duesterhoff | June 13, 1911 |
| 1,486,918 | Plummer | Mar. 18, 1924 |
| 1,945,843 | Woodruff | Feb. 6, 1934 |
| 2,451,394 | Klein | Oct. 12, 1948 |